UNITED STATES PATENT OFFICE.

LEWIS HOLCOMB, OF GRANBY, CONNECTICUT.

IMPROVEMENT IN METHOD OF OILING LEATHER.

Specification forming part of Letters Patent No. 30,320, dated October 9, 1860.

*To all whom it may concern:*

Be it known that I, LEWIS HOLCOMB, of Granby, in the county of Hartford and State of Connecticut, have invented a new and Improved Method of Treating Leather; and I do hereby declare that the following is a full, clear, and exact description of the same.

To enable those skilled in the art to fully understand and use my invention, I will proceed to describe it.

I tan the skins and finish the same in the usual manner, and after the same are perfectly dry, and while stretched in the frame, I rub them with cold tallow. The skins are now removed from the frames, and they are placed each one separately on a smooth board of soft wood, and a hot smoothing-iron is passed over the same. The iron is taken as hot as the skin will bear without burning or injuring the same, and by these means the tallow is spread over the whole surface of the skin perfectly even, and at the same time the pores of the skin are filled up with the grease, and the latter combines with the fibers. The skins are now dried in the open air, and they are ready for use. By these means the skins are rendered completely impervious to water, and a skin treated according to my method will be found superior in every respect to a skin treated in the ordinary manner.

My method is intended in particular to be applied to deer-skins, from which the common belt-lacing is made. In this case strength and toughness are the most desirable and necessary qualities, and I find that a strip cut from a skin prepared according to my invention will bear a weight one-fourth larger than a strip of leather cut from a skin prepared according to the old method, and belt-lacing cut from skins prepared by my process will sooner tear out the holes of the belts than tear asunder themselves.

I am aware that oil and tallow is used extensively for greasing leather, and in Hungary the tallow is put on the hides in a melted state, and each hide is now stretched over charcoal burning on a grate for about a minute, more or less, and after this the pieces are successively laid on an inclined table exposed to the fire, where they are covered with cloth. They are finally hung upon poles in the air to dry, and if the weather be warm they are suspended only during the night, so as to favor the hardening of the grease. By thus exposing the hides to the heat of a fire some parts are treated more and some less, and the tallow will never spread evenly over the whole surface of the skin, and those parts which have been exposed to the strongest heat become injured and liable to crack, while other portions have not been heated sufficiently to absorb the tallow. By the application of a hot smoothing-iron, on the other hand, every part of the skin is impregnated with the tallow, and there is no danger of burning or injuring any portion of the same.

Having thus fully described my invention, what I claim as new, and desire to secure by Letters Patent, is—

The method of treating leather herein described, which consists, substantially, in submitting the leather, after it has been tanned, finished, and covered with tallow, to the action of a hot smoothing-iron, all as set forth.

LEWIS HOLCOMB.

Witnesses:
W. HAUFF,
CHARLES HUGHES.